United States Patent
Mesecher et al.

(10) Patent No.: US 10,082,563 B2
(45) Date of Patent: Sep. 25, 2018

(54) SYNTHESIZED PROFILE

(71) Applicants: David K. Mesecher, Melville, NY (US); Zyad Hajo, Wayne, NJ (US)

(72) Inventors: David K. Mesecher, Melville, NY (US); Zyad Hajo, Wayne, NJ (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 1139 days.

(21) Appl. No.: 14/573,776

(22) Filed: Dec. 17, 2014

(65) Prior Publication Data

US 2018/0067193 A1    Mar. 8, 2018

(51) Int. Cl.
*G01S 7/41* (2006.01)
*G01S 13/58* (2006.01)
*G01S 13/72* (2006.01)

(52) U.S. Cl.
CPC ........... *G01S 7/412* (2013.01); *G01S 13/582* (2013.01); *G01S 13/726* (2013.01)

(58) Field of Classification Search
CPC . G01S 7/41; G01S 7/411; G01S 7/412; G01S 7/414; G01S 7/415; G01S 13/42; G01S 13/46; G01S 13/582; G01S 13/584; G01S 13/72; G01S 13/726; G01S 13/86; G01S 13/867
See application file for complete search history.

(56) References Cited

U.S. PATENT DOCUMENTS

| | | | |
|---|---|---|---|
| 5,963,653 A * | 10/1999 | McNary | G01S 7/417 342/109 |
| 6,042,050 A * | 3/2000 | Sims | F41G 7/2226 244/3.15 |
| 6,502,053 B1 * | 12/2002 | Hardin | G01P 3/38 702/142 |
| 6,741,341 B2 * | 5/2004 | DeFlumere | F41G 7/008 250/203.6 |
| 6,877,691 B2 * | 4/2005 | DeFlumere | G01S 7/4802 244/3.1 |
| 6,903,676 B1 * | 6/2005 | Frady | F41H 11/00 342/52 |

(Continued)

FOREIGN PATENT DOCUMENTS

WO    WO 2002/021641 A    3/2002

OTHER PUBLICATIONS

International Search Report for Application No. PCT/US2015/061326 dated Oct. 25, 2016.

(Continued)

*Primary Examiner* — Peter M Bythrow
(74) *Attorney, Agent, or Firm* — Tarolli, Sundheim, Covell & Tummino LLP

(57) ABSTRACT

A target identifier can be configured to determine a synthesized profile for a target based on active sensor data that characterizes a radio frequency ("RF") signal reflected by the target and received at an active sensor system. The synthesized profile can characterize an estimated Line of Bearing ("LoB") and a radial speed ("Rdot") of the target relative to a passive sensor system. The target identifier can also be configured to match the synthesized profile with a measured profile that is determined based on RF signals received at the passive sensor system. The measured profile characterizes a measured LoB and a measured Rdot of the target.

20 Claims, 14 Drawing Sheets

(56) References Cited

U.S. PATENT DOCUMENTS

| | | | |
|---|---|---|---|
| 7,548,184 B2* | 6/2009 | Lo | F41G 7/008 244/3.15 |
| 7,626,538 B2* | 12/2009 | Rose | G01S 3/46 342/104 |
| 7,719,461 B1* | 5/2010 | Mookerjee | G01S 7/003 342/107 |
| 7,952,513 B2* | 5/2011 | Tietjen | F41G 3/147 342/118 |
| 8,149,156 B1* | 4/2012 | Allred | G01S 13/583 342/146 |
| 8,208,129 B2* | 6/2012 | Yahav | G01S 7/486 356/3.01 |
| 8,378,880 B1* | 2/2013 | Boka | G01S 13/726 244/3.1 |
| 9,212,869 B1* | 12/2015 | Boardman | G01S 13/726 |
| 9,285,190 B1* | 3/2016 | Boardman | F41G 7/008 |
| 2003/0184468 A1* | 10/2003 | Chen | G06K 9/3241 342/52 |
| 2004/0150552 A1* | 8/2004 | Barbella | G01S 13/24 342/109 |
| 2006/0125679 A1* | 6/2006 | Horibe | G01S 17/023 342/52 |
| 2006/0279453 A1* | 12/2006 | Caber | G01S 13/726 342/97 |
| 2007/0075892 A1* | 4/2007 | Horibe | G01S 17/023 342/70 |
| 2009/0015460 A1* | 1/2009 | Fox | G01S 7/2922 342/53 |
| 2010/0013697 A1* | 1/2010 | De Waard | G01S 13/66 342/59 |
| 2012/0112951 A1* | 5/2012 | Nakanishi | G01S 13/931 342/107 |
| 2012/0206289 A1 | 8/2012 | Allam | |
| 2014/0324339 A1* | 10/2014 | Adam | G01S 13/726 701/519 |
| 2014/0354464 A1* | 12/2014 | Butt | G01S 13/003 342/18 |

OTHER PUBLICATIONS

Ito, et al.: "Sensor-to-Sensor Target Association in a Network of Passive Sensors"; Industrial Electronics, Control and Instrumentation, 1997. IECON 97. 23rd international Conference on. vol. 3. IEEE, 1997.

Mellema: "*An Automated Approach to Passive Sonar Track Segment Association*"; Proceedings of the 7th International Command and Control Research and Technology Symposium, Québec City, Canada. 2002.

Canadian Office Action corresponding to Canadian Patent Application No. 2,970,142, dated Apr. 25, 2018.

* cited by examiner

SYNTHESIZED PROFILE

TECHNICAL FIELD

This disclosure relates to a synthesized profile of a target.

BACKGROUND

Active radar is an object-detection system that uses radio waves to determine the range, altitude, direction and/or speed of objects. Active radar can be used to detect aircraft, ships, spacecraft, guided missiles, motor vehicles, weather formations and terrain. An active radar system can include a radar dish or antenna that transmits pulses of radio waves or microwaves that bounce off any object in their path. The object reflects a small part of the wave's energy to a dish or antenna that can be located at the same or different site as the transmitter.

Passive sensor systems (also referred to as passive coherent location, passive covert radar and passive radar systems) encompass a class of radar systems that detect and track objects by processing reflections or transmissions from sources of illumination in the environment. Such sources can include, but are not limited to communications signals and commercial broadcast signals that are transmitted or reflected from a target. In some situations, the sources can be cooperative, and in other situations, the sources can be non-cooperative. The term "passive sensor system" can indicate a system that is configured to detect all such sources or some subset thereof.

SUMMARY

One example relates to a target identifier comprising one or more computing devices having machine readable instructions, the target identifier being configured to determine a synthesized profile for a target based on active sensor data that characterizes a radio frequency ("RF") signal reflected by the target and received at an active sensor system. The synthesized profile can characterize an estimated Line of Bearing ("LoB") and a radial speed ("Rdot") of the target relative to a passive sensor system. The target identifier can be further configured to match the synthesized profile with a measured profile that is determined based on RF signals received at the passive sensor system. The measured profile characterizes a measured LoB and a measured Rdot of the target.

Another example relates to a system that can include an active sensor system configured to measure RF signals reflected from a plurality of targets. The reflected RF signals can characterize a range and azimuth for each of the plurality of targets. The system can also include a passive sensor system configured to passively receive RF signals transmitted by the plurality of targets. The system can further include a passive sensor analyzer configured to generate a measured profile for each of the plurality of targets based on the passively received RF signals. Each measured profile can characterize a measured LoB and a measured Rdot over a time period of a corresponding target of the plurality of targets. The system can yet further include an active sensor analyzer configured to determine a position and a track for each of the plurality of targets. The active sensor analyzer can also be configured to determine a synthesized profile for each of the plurality of targets based on the reflected RF signals. The synthesized profile can characterize an estimated LoB and an estimated Rdot over the time period for each of the plurality of targets relative to the passive sensor system. The system can still yet further include a profile matcher configured to match each of the measured profiles with a corresponding synthesized profile.

Yet another example relates to a method that can include determining a measured profile for each of a plurality of targets based on passive measurements, each measured profile can characterize a measured LoB and a measured Rdot over a time period relative to a passive sensor system that that determines the passive measurements. The method can also include generating a synthesized profile for each of the plurality of targets based on data that characterizes RF signals reflected from the plurality of targets. Each synthesized profile can characterize an estimated LoB and an estimated Rdot over the time period for a corresponding target. The method can further include matching each measured profile with a corresponding synthesized profile based on a statistical analysis.

DETAILED DESCRIPTION

Examples of systems and methods for providing identification (ID) and a precise position of targets of interest in an area of interest are described. The system can include a passive sensor platform that can be configured to provide passive sensor data (e.g., measurements) for each of a plurality of targets over a period of time. The passive sensor data can be employed, for example to determine a measured line-of-bearing ("LoB") and a measured radial speed ("Rdot"), for each of the plurality of targets. The LoB and the Rdot can be employed to determine a target ID based on a signature database. The LoB and the Rdot can be employed to develop (passive) measured profiles for each of the plurality of targets.

The system can also include an active sensor platform configured to provide active sensor data (e.g., measurements of reflected signals) for each of the plurality of targets. The active sensor data can be employed, for example to determine a relatively precise position and a track of each of the plurality of targets over time. The system can employ the active sensor data and kinematics of the passive sensor platform to generate synthesized profiles over the period of time for each of the plurality of targets. Each synthesized profile can include data that provides estimations (predictions) of the LoB and Rdot for an associated target of the plurality of targets that the passive sensor platform should have sensed. The system can include a profile matcher configured to match each measured profile with a corresponding synthesized profile for each of the plurality of targets to generate a combined target data set that includes intelligence gathered from both the active sensor platform and the passive sensor platform.

Figure 1:
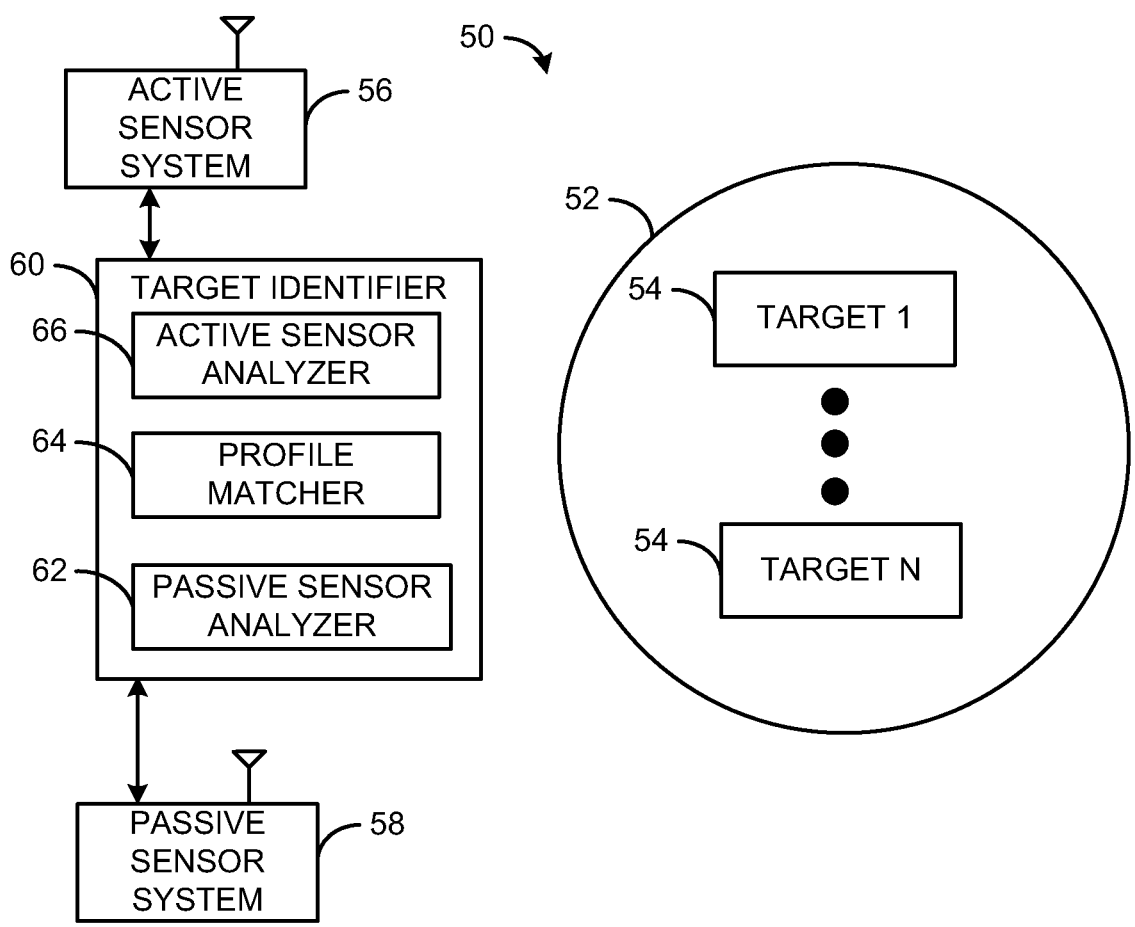
FIG. 1 illustrates an example of a system for generating a synthesized profile of a target and matching the synthesized profile to a measured profile.

FIG. 1 illustrates a system 50 for generating synthesized profiles of targets and matching the synthesized profiles to a measured profile. The system can include an area of interest 52 with N number targets 54, where N is an integer greater than or equal to one. Each of the N number of targets 54 can be an aircraft, a watercraft, a land vehicle, a spacecraft, a guided missile, etc. The system 50 can include an active sensor system 56 (platform) and a passive sensor system 58 (platform). The area of interest 52 can be, for example, an area that can be tracked by both the active sensor system 56 and the passive sensor system 58.

The active sensor system 56 can be implemented, for example, as an active radar system. The active sensor system 56 can be configured to transmit radio frequency ("RF") signals via an antenna into free space. Each of the N number of targets 54 that are within range of the active sensor system 56 (e.g., the area of interest 52) reflects a small portion of the RF signal. The reflected portion of the transmitted signal, which can be referred to as a reflected signal, can be received by the active sensor system 56 at the same or different antenna that propagated the transmitted signal. Data characterizing reflected signals can be provided to a target identifier 60, which can be referred to as active sensor data.

The passive sensor system 58 can operate as a passive radar system. The passive sensor system 58 can include an antenna configured to detect RF signals transmitted from each of the N number of targets 54, which RF signals can be referred to as detected signals. In some examples, the passive sensor data can be employed by the passive sensor system 58 to determine passive measurements for the N number of targets 54. The passive measurements can be provided to the target identifier 60. The passive measurements can include, for example, line of bearing ("LoB") (e.g., an angle of arrival) and radial speed ("Rdot") relative to the passive sensor system 58.

The target identifier 60 can be implemented, for example, as a computing device, such as a system with a processing unit (e.g., one or more processor cores) as well as memory that can store machine readable instructions. The processing unit can access the memory and execute the machine readable instructions. In other examples, the target identifier 60 can be implemented as a controller with embedded instructions.

The target identifier 60 can include a passive sensor analyzer 62 configured to determine a measured profile for each of the N number of targets 54 based on the passive measurements. The measured profile of each of the N number of targets 54 can characterize the LoB over time and the Rdot over time. The passive sensor analyzer 62 can access a database that includes target signatures to determine a target identification (ID) for each of the N number of targets 54 based on measured profiles. The target signatures can include, for example, previously determined (measured) waveform parameters, such as a pulse width, a pulse repetition interval, a radio frequency, a scan pattern, etc. The target ID can characterize a type of target 54 (e.g., a model of an aircraft, a type of guided missile, etc.). The target ID can be added to each measured profile. Additionally, the measured profile for each of the N number of targets 54 can be provided to a profile matcher 64 of the target identifier 60.

The target identifier 60 can also include an active sensor analyzer 66 that can be configured to process the active sensor data that characterizes the reflected signals provided from the active sensor system 56. The active sensor analyzer 66 can be configured to employ the active sensor data to determine a radar range and azimuth measurements of each of the N number of targets 54. The determined radar range and azimuth measurements of each of the N number of targets 54 can be employed to determine a relatively precise location and track for each of the N number of targets 54 over time. Additionally, the active sensor analyzer 66 can be configured to receive kinematics characterizing a physical location and velocity of the receiving antenna at the passive sensor system 58. The active sensor analyzer 66 can be configured to employ the kinematics of the passive sensor system 58 and the active sensor data to determine an estimated (e.g., expected) LoB and Rdot measurements relative to the passive sensor system 58. The active sensor analyzer 66 can generate a synthesized profile of each of the N number of targets 54 that characterizes the estimated LoB over time and the estimated Rdot over time relative to the passive sensor system 58. Additionally, the active sensor analyzer 66 can add the determined position and tracking of a corresponding target 54 to each of the synthesized profiles. The synthesized profile for each of the N number of targets 54 can be provided to the profile matcher 64 of the target identifier 60.

The profile matcher 64 can employ statistical analysis to match each of the synthesized profiles with a corresponding measured profile. Thus, based on the statistical analysis, the profile matcher 64 can generate a combined target data set for each of the N number of targets 54. The combined target data set can include the relatively accurate position, the track, the target ID, the LoB and the Rdot over time (or some subset thereof) for each of the N number of targets 54. Thus, by employment of the system 50, intelligence information about each of the N number of targets 54 determined from the active sensor system 56 can be combined and reconciled with intelligence information about each of the N number of targets 54 gathered from the passive sensor system 58 to generate the combined target data sets, thereby maximizing the potential intelligence for each of the N number of targets 54 at both the active sensor system 56 and the passive sensor system 58.

Figure 2:
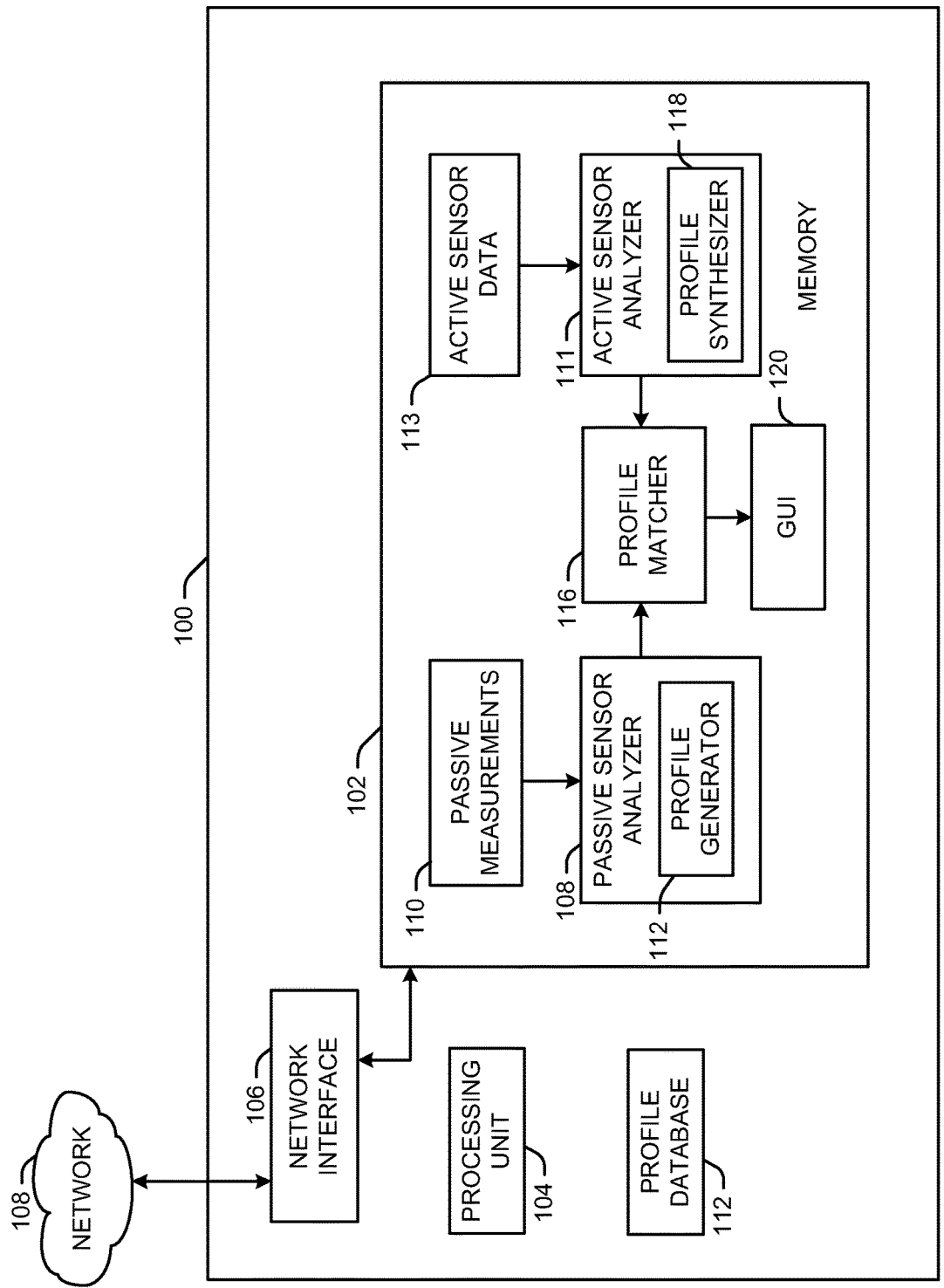
FIG. 2 illustrates an example of a target identifier.

FIG. 2 illustrates an example of a target identifier 100 that could be employed, for example, as the target identifier 60 illustrated in FIG. 1. The target identifier 100 can include a memory 102 that can store machine readable instructions and data. The memory 102 could be implemented, for example, as non-transitory computer readable media, such as volatile memory (e.g., random access memory), nonvolatile memory (e.g., a hard disk drive, a solid state drive, flash memory, etc.) or a combination thereof. The target identifier 100 can also include a processing unit 104 to access the memory 102 and execute the machine-readable instructions. The processing unit 104 can include, for example, one or more processor cores. The target identifier 100 can include a network interface 106 configured to communicate with a network 108. The network interface 106 could be implemented, for example, as a network interface card. The network 108 could be implemented for example, as a private network (e.g., a local area network (LAN) and/or a wide area network (WAN), a dedicated connection, etc.).

The target identifier 100 could be implemented, for example in a distributed computing system, such as a computing cloud. In such a situation, features of the target identifier 100, such as the processing unit 104, the network interface 106, and the memory 102 could be representative of a single instance of hardware or multiple instances of hardware with applications executing across the multiple instances (e.g., distributed) of hardware (e.g., computers, routers, memory, processors, or a combination thereof). For instance, some of the features implemented on the target identifier 100 could alternatively be implemented in an active sensor system (e.g., the active sensor system 56 of FIG. 1) and/or a passive sensor system (e.g., the passive sensor system 58 of FIG. 1). Alternatively, the target identifier 100 could be implemented on a single dedicated computing device.

The target identifier 100 can include a passive sensor analyzer 108 that can be configured to process passive measurements 110 that can be provided to the target identifier 100 from a passive sensor system (e.g., the passive sensor system 58 of FIG. 1) via the network interface 106. The passive sensor system can be implemented, for example, as a passive radar system. The passive measurements 110 can include, for example, an LoB and an Rdot for each of a plurality of targets that are passively detected by the passive sensor system. The target identifier 100 can also include an active sensor analyzer 111 configured to process active sensor data 113 that can be provided from an active sensor system (e.g., the active sensor system 56 of FIG. 1) via the network interface 106. The active sensor system can be implemented, for example, as an active radar system. The active sensor data 113 can characterize reflected signals (RF signals) such as portions of transmitted signals that are reflected by the plurality of targets.

Figure 3:
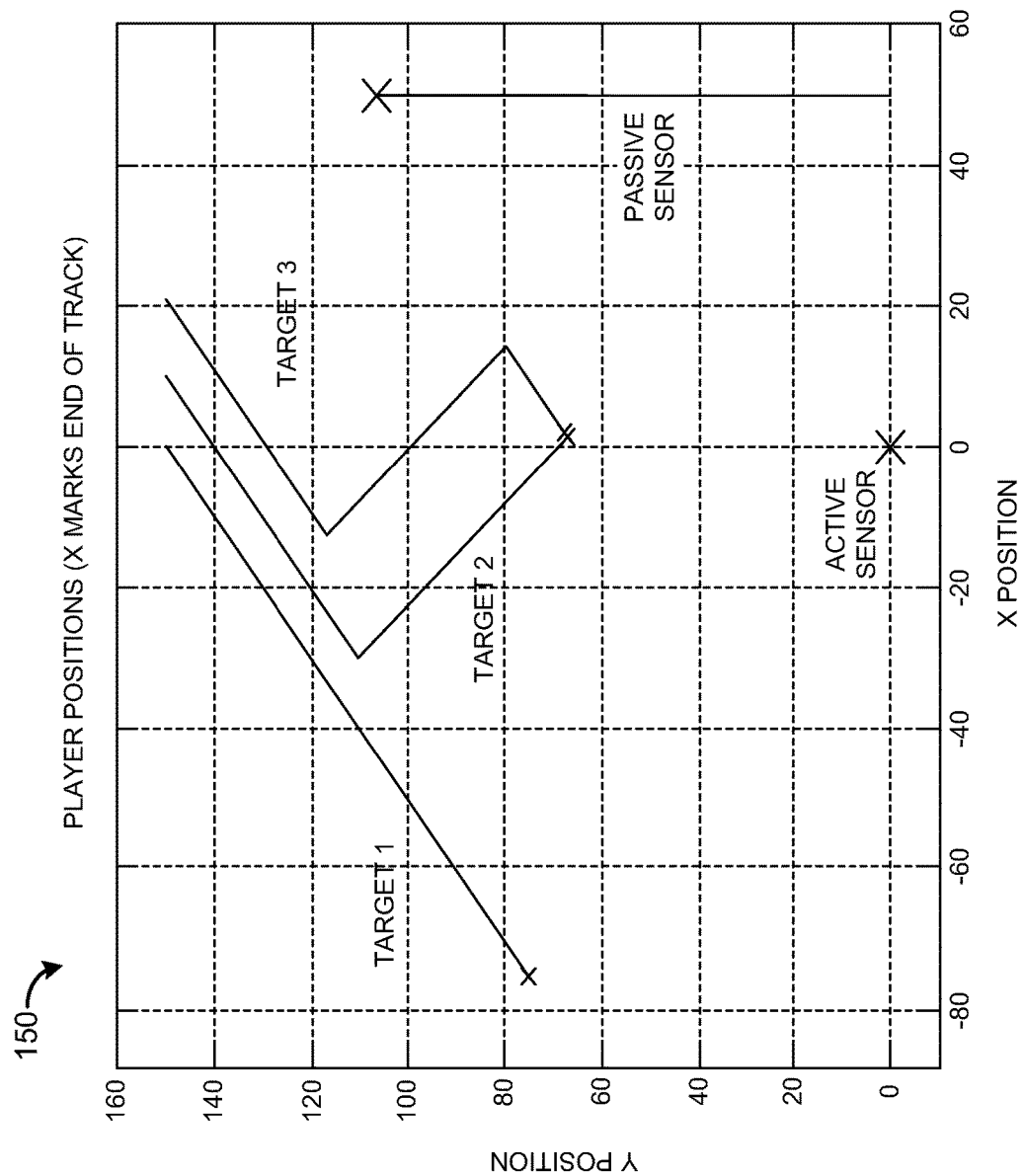
FIG. 3 illustrates an example of a chart of an area of interest.

The operation of the target identifier 100 may be better understood with an extended example (hereinafter, "the given example"). In the given example, it is presumed that the active sensor system and the passive sensor system are tracking three targets in an area of interest. FIG. 3 is a chart 150 of X-Y coordinates of an area of interest plotted in arbitrary units of length for the given example. In the chart 150, the active sensor system (labeled in FIG. 3 as "ACTIVE SENSOR") is stationary and is positioned at an origin of the chart (position 0,0). Additionally, the passive sensor system (labeled in FIG. 3 as "PASSIVE SENSOR") is moving in the Y direction from about the point (50,0) to about the point (50,110). In the given example, three targets, "Target 1", "Target 2" and "Target 3" can be detected by both the active sensor system and the passive sensor system. In the given example, each of the three targets could be, for example, aircraft. However, in other examples, the targets could also be terrestrial vehicles and/or watercraft. Moreover, in other examples, there could be more or fewer targets in the area of interest. For the given example, it is presumed that Target 1 is traveling with a relatively constant heading. Additionally, in the given example, Target 2 and Target 3 make 1.5 G constant-speed turns.

Figure 4:
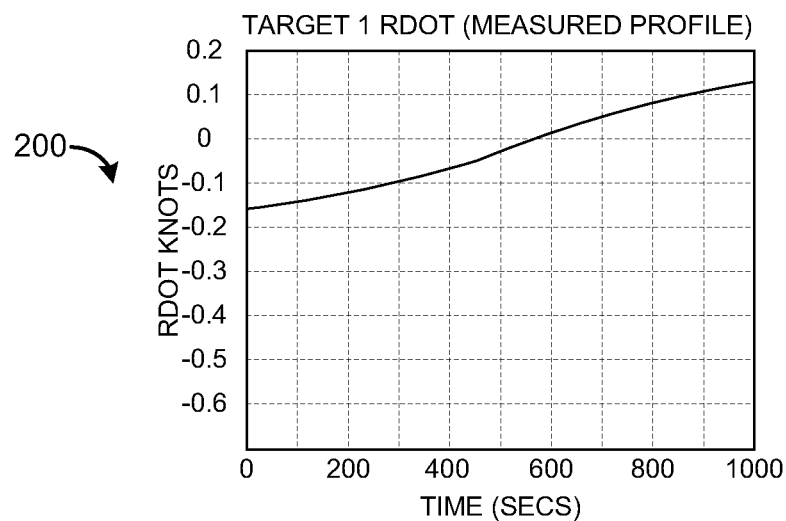
FIGS. 4-9 illustrate examples of charts that plot data in measured profiles.
Figure 5:
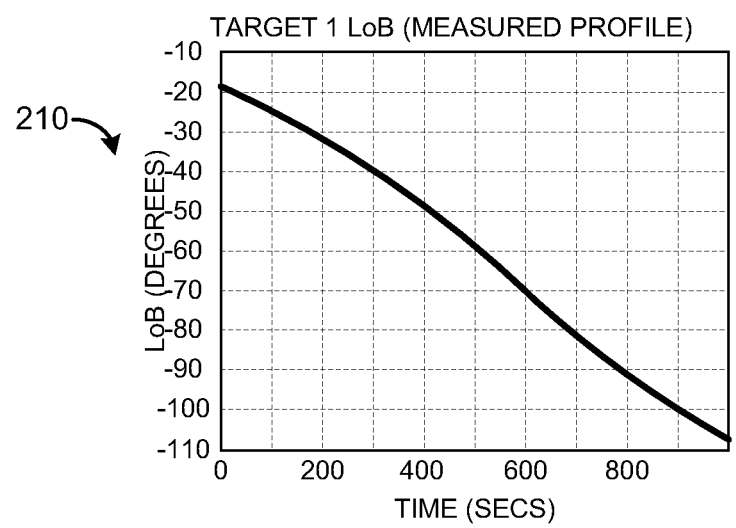
Figure 6:
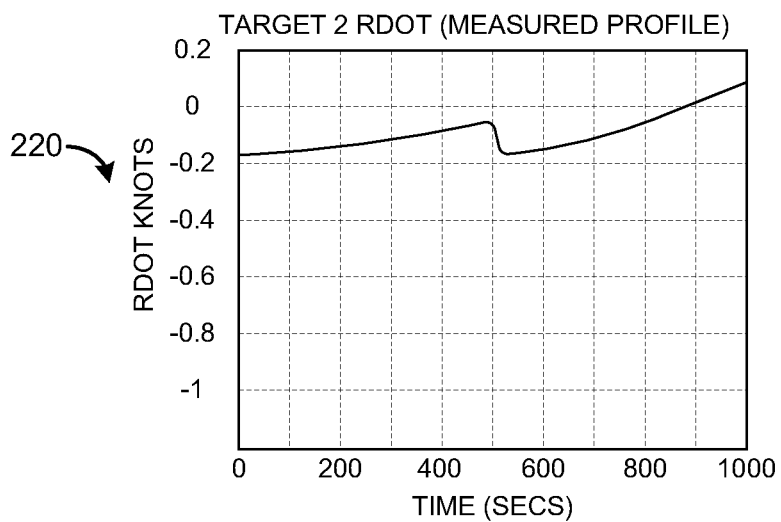
Figure 7:
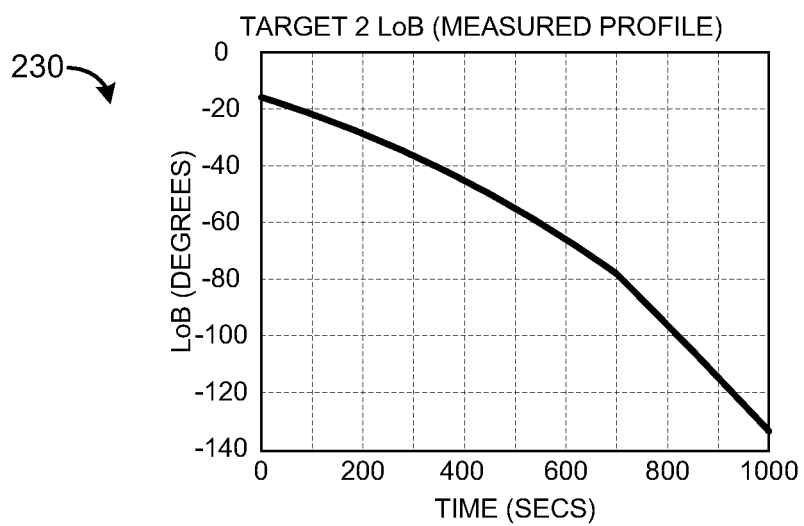
Figure 8:
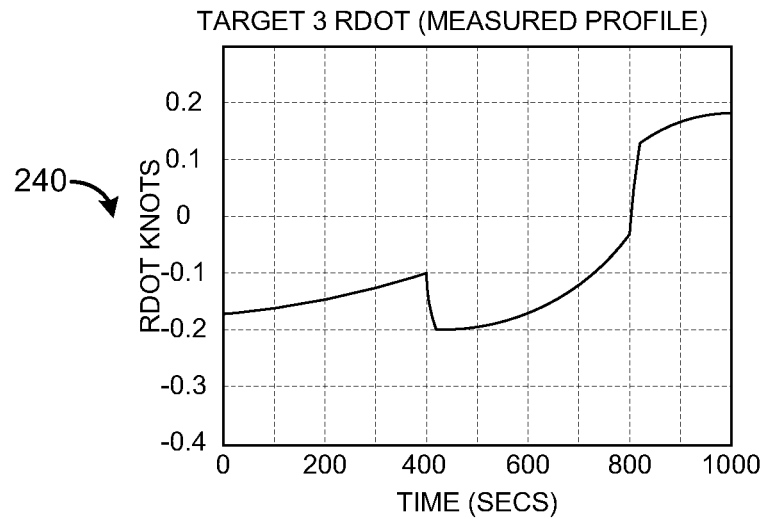
Figure 9:
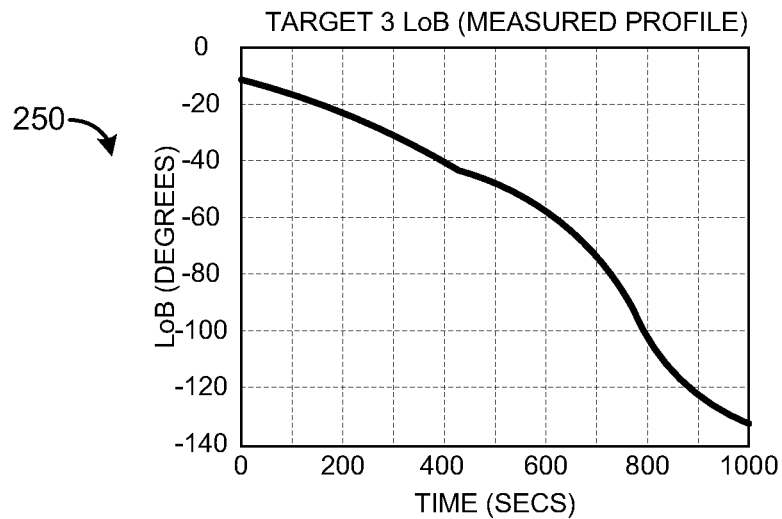

In the given example, the passive sensor analyzer 108 can be configured to determine an LoB and an Rdot for each the three targets over a given time period (e.g., 10 seconds or more) based on the passive measurements 110. Additionally, the passive sensor analyzer 108 can include a profile generator 112 configured to determine a measured profile for each of the three targets. The measured profile of each of the three targets can include data that characterizes a plot of the LoB over the given time period and a plot that characterizes the Rdot over the given time period for a corresponding target. Continuing with the given example, FIG. 4 illustrates an example of a chart 200 plotting LoB (in knots) as a function of time (in seconds) for Target 1, and FIG. 5 illustrates an example of a chart 210 plotting Rdot (in degrees) as a function of time (in seconds) for Target 1. Similarly, FIG. 6 illustrates an example of a chart 220 plotting LoB (in knots) as a function of time (in seconds) for Target 2, and FIG. 7 illustrates an example of a chart 230 plotting Rdot (in degrees) as a function of time (in seconds) for Target 2. Further, FIG. 8 illustrates an example of a chart 240 plotting LoB (in knots) as a function of time (in seconds) for Target 3, and FIG. 9 illustrates an example of a chart 250 plotting Rdot (in degrees) as a function of time (in seconds) for Target 3.

Referring back to FIG. 2, upon generation of the measured profile, the passive sensor analyzer 108 can access a profile database 114 that stores pre-determined waveform signatures for a plurality of identified targets, which waveform signatures can include measured waveform parameters. The database 114 can be stored locally on the target identifier 100, or the database 114 can be remotely accessible and stored on an external system. The passive sensor analyzer 108 can employ a pattern matching algorithm to compare the measured waveform parameters of each of the three targets to determine a target ID for each of the three targets. In some examples, the target ID can reveal the type (e.g., the model) of the target. Continuing with the given example, the target ID of each of the three targets can be added to the corresponding measured profile. Additionally, the measured profiles for each of the three targets (Target 1, Target 2 and Target 3) can be provided to a profile matcher 116 of the target identifier 100.

Figure 10:
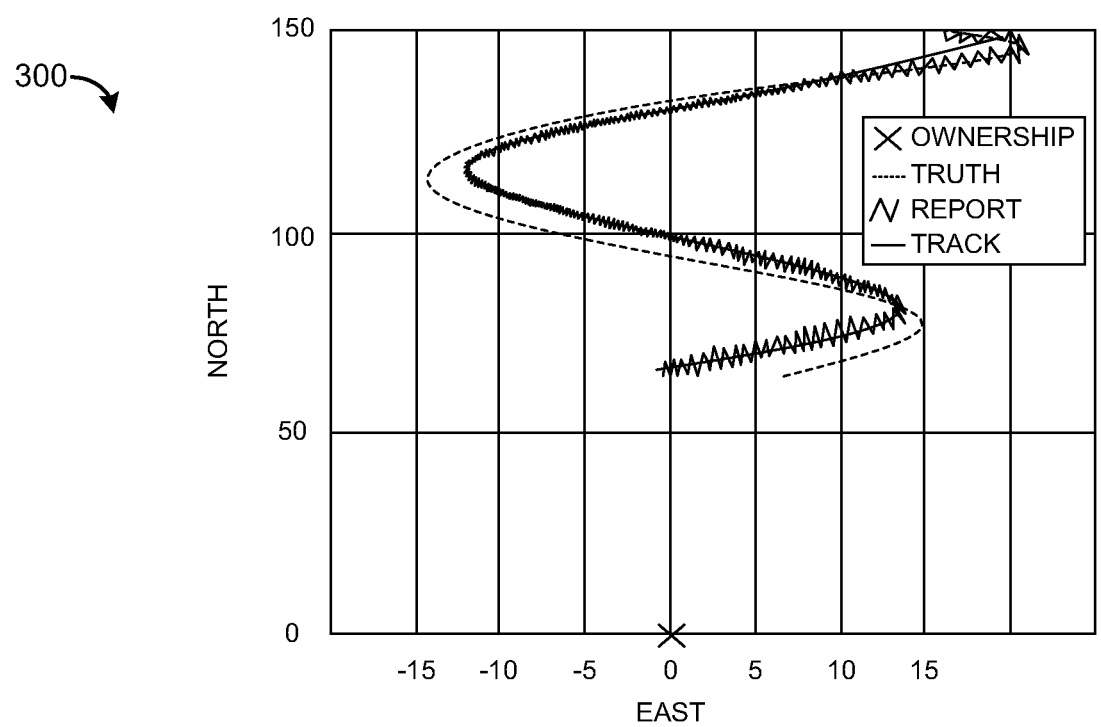
FIG. 10 illustrates an example of a chart that plots data from an active sensor system.

Continuing with the given example, the active sensor analyzer 111 can analyze the active sensor data 113 to determine a range and azimuth for each of the three targets over the given time period. Moreover, the active sensor can employ the range an azimuth of each of the plurality of targets to determine a position and track of each of the three targets over the given time period. FIG. 10 illustrates a chart 300 that plots the active sensor data 113 of FIG. 2 for Target 3 in X-Y coordinates in the given example. As illustrated in the chart 300, a series of data points characterizing substantially instantaneous instances of a measured range and azimuth detected as reflected RF signals can be characterized in the active sensor data 113. In the given example, the active sensor analyzer 111 can employ the active sensor data 113 to determine a position and velocity over time for Target 3. The position can be represented as line labeled as "TRACK" in FIG. 10. Referring back to FIG. 2, in the given example, the active sensor system can provide similar active sensor data 113 for Target 1 and Target 2.

Figure 11:
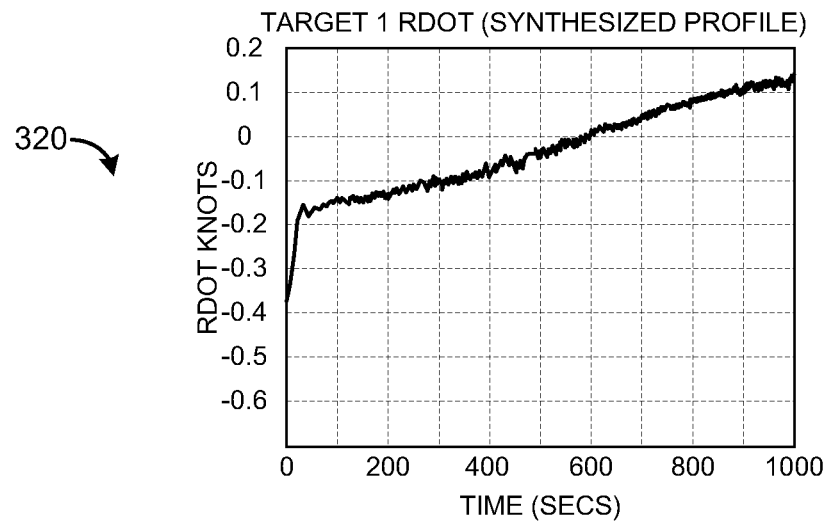
FIGS. 11-16 illustrate examples of charts that plot data in synthesized profiles.
Figure 12:
Figure 13:
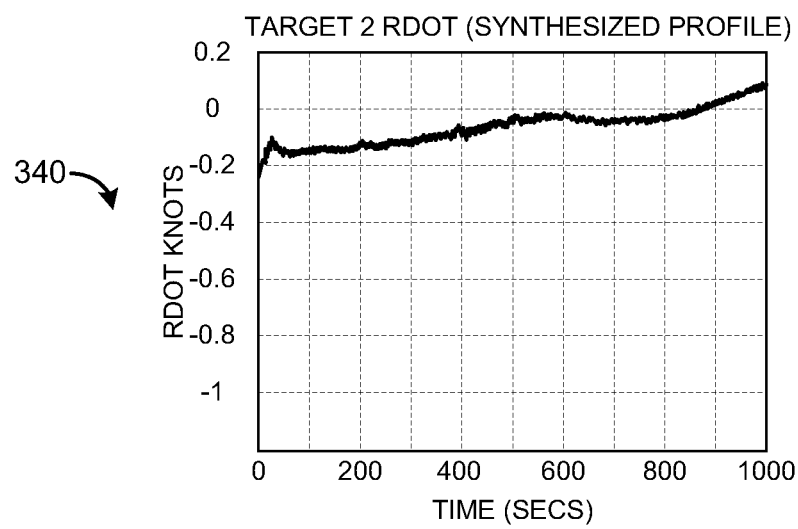
Figure 14:
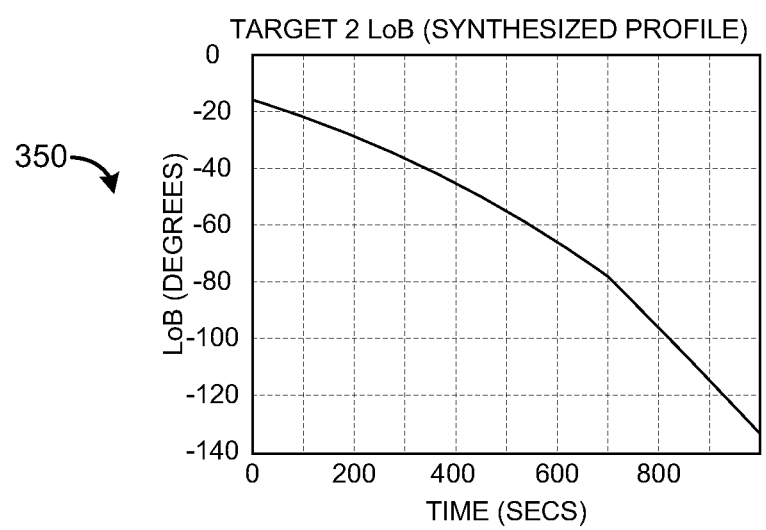
Figure 15:
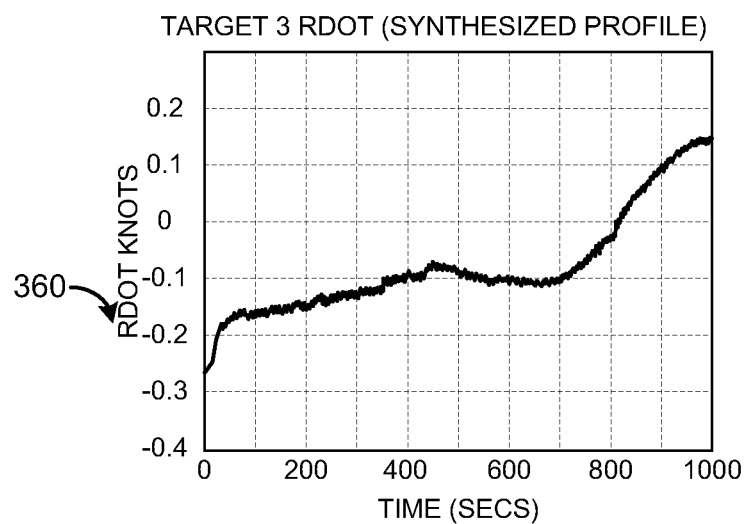
Figure 16:
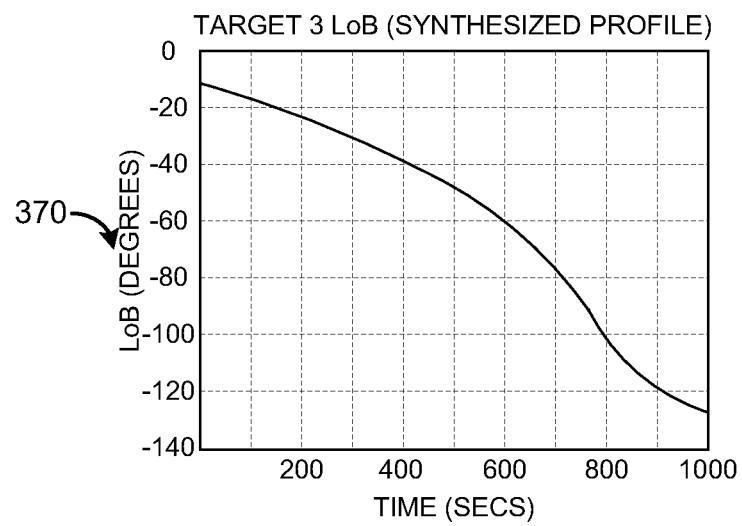

Continuing with the given example, the active sensor analyzer 111 can include a profile synthesizer 118 that can generate a synthesized profile that corresponds to an estimated (e.g., expected) LoB and Rdot at the passive sensor system for each of the three targets over the given period of time. To generate the synthesized profiles, the profile synthesizer 118 can employ kinematics (e.g., position and velocity) of the passive sensor system (e.g., a receiving antenna at the passive sensor system) and the position and track of a corresponding target as generated by the active sensor analyzer 111 based on the active sensor data 113. FIG. 11 illustrates an example of a chart 320 plotting an estimated LoB (in knots) as a function of time (in seconds) for a first target, and FIG. 12 illustrates an example of a chart 330 plotting an estimated Rdot (in degrees) as a function of time (in seconds) for the first target that can be determined by the profile synthesizer 118 in the given example. FIG. 13 illustrates an example of a chart 340 plotting an estimated LoB (in knots) as a function of time (in seconds) for a second target, and FIG. 14 illustrates an example of a chart 350 plotting an estimated Rdot (in degrees) as a function of time (in seconds) for the second target that can be determined by the profile synthesizer 118 in the given example. FIG. 15 illustrates an example of a chart 360 plotting an estimated LoB (in knots) as a function of time (in seconds) for a third target, and FIG. 16 illustrates an example of a chart 370 plotting an estimated Rdot (in degrees) as a function of time (in seconds) for the third target that can be determined by the profile synthesizer 118 in the given example. The active sensor analyzer 111 can add the position and track of each of the targets to the corresponding synthesized profiles. The synthesized profiles for the first, second and third targets can be provided to the profile matcher 116.

The profile matcher 116 can employ statistical analysis of the measured profiles provided by the passive sensor analyzer 108 to match each measured profile with a corresponding synthesized profile provided by the active sensor analyzer 111. In particular, the profile matcher 116 can employ statistical analysis to compare each measured LoB and Rdot plot over the given time period for each measured profile to each synthesized LoB and Rdot plot over the given time period for each synthesized profile. The profile matcher 116 can quantify a match between a given measured profile and a given synthesized profile by calculating a statistical difference or Mahalanobis distance for a given point on of a profile based on Equation 1.

$$D_i^2 = (m_i - s_i)^T S_i^{-1}(m_i - s_i)$$ Equation 1:

wherein:

$D_i^2$ = The Mahalanobis distance for the the point $i$ $m_i = \begin{pmatrix} \text{Measured } Rdot \text{ at update } i \\ \text{Measured } LoB \text{ at update } i \end{pmatrix}$ $s_i = \begin{pmatrix} \text{Synthesized } Rdot \text{ at update } i \\ \text{Synthesized } LoB \text{ at update } i \end{pmatrix}$ $S_i = \begin{bmatrix} \sigma_{Rdot_i}^2 & 0 \\ 0 & \sigma_{LoB_i}^2 \end{bmatrix}$ $i$ = a given instance of time $\sigma_{Rdot_i}^2$ = Measured $Rdot$ Uncertainty$^2$ + Synthesized $Rdot$ Uncertainty$^2$ $\sigma_{LoB_i}^2$ = Measured $LoB$ Uncertainty$^2$ + Synthesized $LoB$ Uncertainty$^2$ Additionally, the profile matcher 116 can employ Equation 2 to determine a cumulative (and normalized) Mahalanobis distance.

$$\overline{D}_i^2 = \frac{1}{i}\sum_{k=1}^{i} D_k^2$$ Equation 2 wherein:

$\overline{D}_i^2$=The cumulative and normalized Mahalanobis Distance

Figure 17:
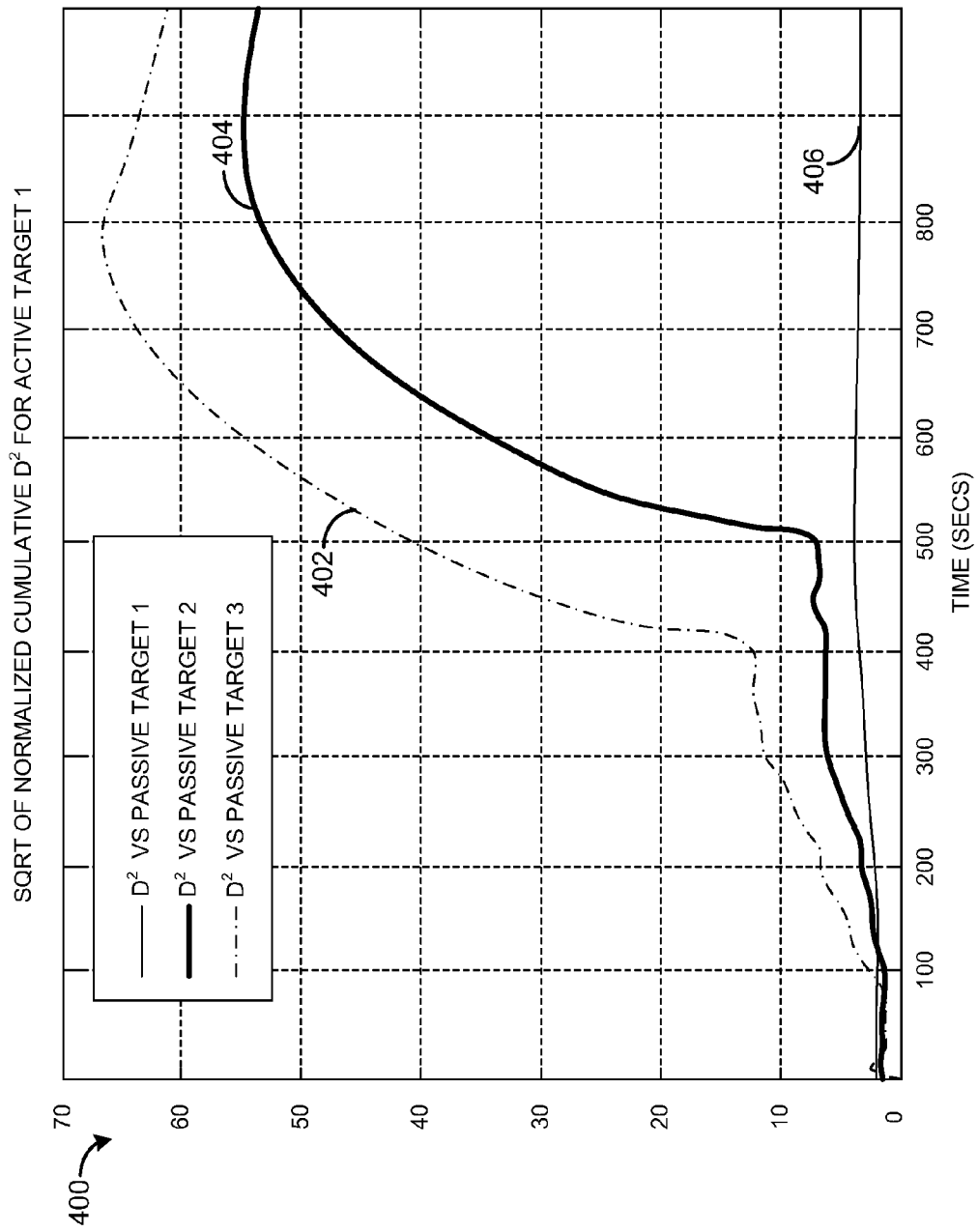
FIG. 17 illustrates a chart that plots cumulative Mahalanobis distances as a function of time.

By employing Equations 1 and 2, the profile matcher 116 can match each measured profile with a corresponding synthesized profile. In the given example, the cumulative Mahalanobis distance between the synthesized profile for Target 1 and the measured profiles for the first target, the second target, and the third target is illustrated in FIG. 17. Specifically, FIG. 17 illustrates an example of a chart 400 that plots cumulative (and normalized) Mahalanobis distances as a function of time (in seconds). In the chart 400, a first line 402 characterizes a cumulative and normalized Mahalanobis distance between the synthesized profile for Target 1 (characterized by the charts in FIGS. 11 and 12) and the measured profile for the third target (characterized in the charts in FIGS. 8 and 9). Additionally, in the chart 400, a second line 404 characterizes a cumulative and normalized Mahalanobis distance between the synthesized profile for Target 1 (characterized by the charts in FIGS. 11 and 12) and the measured profile for the second target (characterized in the charts in FIGS. 6 and 7). Further, in the chart 400, a third line 406 characterizes a cumulative and normalized Mahalanobis distance between the synthesized profile for Target 1 (characterized by the charts in FIGS. 11 and 12) and the measured profile for the first target (characterized in the charts in FIGS. 4 and 5). As is illustrated in the chart 400, the third line 406 has the smallest cumulative and normalized Mahalanobis distance over time. Thus, based on the analysis, in the given example, the profile matcher 116 can match the measured profile of Target 1 with the synthesized profile of the first target. A similar process can be completed for matching the measured profile of Target 2 and Target 3 with the synthesized profiles for the second and third targets.

Additionally, for each point in time recorded, a total cumulative statistical distance can be calculated by the profile matcher 116 for each possible combination of measured profile and synthesized profile. The pattern matcher can be configured such that the combination that has the smallest statistical distance is selected as the match. The total number of possible combinations is M! ("M-Factorial"), where M is a number of targets. In the given example, the total number of combinations is 3! (6).

To determine the total cumulative Mahalanobis Distance for a particular combination in the given example, the Mahalanobis Distances between the three synthesized-profile-pair-to-actual-profile-pair associations in a combination can be summed. For instance, in Combination 1 of the given example, there are the following three associations:

1.) The synthesized profile pair of Target 1 is associated with the actual profile pair of Target 1;
2.) The synthesized profile pair of Target 2 is associated with the actual profile pair of Target 2; and
3.) The synthesized profile pair of Target 3 is associated with the actual profile pair of Target 3.

For each of these associations, the following three Mahalanobis Distances between the synthesized profile pair and the actual profile pair can be determined using the method shown and described in Equations 1 and 2:

$\overline{D}_{i_{1,1}}^2$=Cumulative and normalized Mahalanobis Distance between the synthesized profile pair of Target 1 the actual profile pair of Target 1 at update i;

$\overline{D}_{i_{2,2}}^2$=Cumulative and normalized Mahalanobis Distance between the synthesized profile pair of Target 2 the actual profile pair of Target 2 at update i; and $\overline{D}_{i_{3,3}}^2$=Cumulative and normalized Mahalanobis Distance between the synthesized profile pair of Target 3 the actual profile pair of Target 3 at update i.

The total cumulative Mahalanobis Distance for Combination 1, $\overline{D}_{i_{C1}}^2$ is given by Equation 3, which is a sum of the cumulative Mahalanobis Distance for each association:

$$\overline{D}_{i_{C1}}^2 = \overline{D}_{i_{1,1}}^2 + \overline{D}_{i_{2,2}}^2 + \overline{D}_{i_{3,3}}^2$$ Equation 3:

In another instance in the given example, consider Combination 6, which has the following three associations:
1.) The synthesized profile pair of Target 1 is associated with the actual profile pair of Target 3;
2.) The synthesized profile pair of Target 2 is associated with the actual profile pair of Target 2; and
3.) The synthesized profile pair of Target 3 is associated with the actual profile pair of Target 1.

In the given example, for each of these associations the following three Mahalanobis Distances between the synthesized profile pair and the actual profile pair is determined using the method shown and described in Equations 1 and 2:

$\overline{D}_{i_{1,3}}^{2}$=Cumulative and normalized Mahalanobis Distance between the synthesized profile pair of Target 1 the actual profile pair of Target 1 at update i;

$\overline{D}_{i_{2,2}}^{2}$=Cumulative and normalized Mahalanobis Distance between the synthesized profile pair of Target 2 the actual profile pair of Target 2 at update i; and $\overline{D}_{i_{3,1}}^{2}$=Cumulative and normalized Mahalanobis Distance between the synthesized profile pair of Target 3 the actual profile pair of Target 3 at update i.

In the given example, the total cumulative Mahalanobis Distance for Combination 6, $\overline{D}_{i_{C6}}^{2}$ is given by Equation 4, which is a sum of the cumulative Mahalanobis Distance for each association:

$$\overline{D}_{i_{C6}}^{2}=\overline{D}_{i_{1,3}}^{2}+\overline{D}_{i_{2,2}}^{2}+\overline{D}_{i_{3,1}}^{2} \quad \text{Equation 4:}$$

Figure 18:
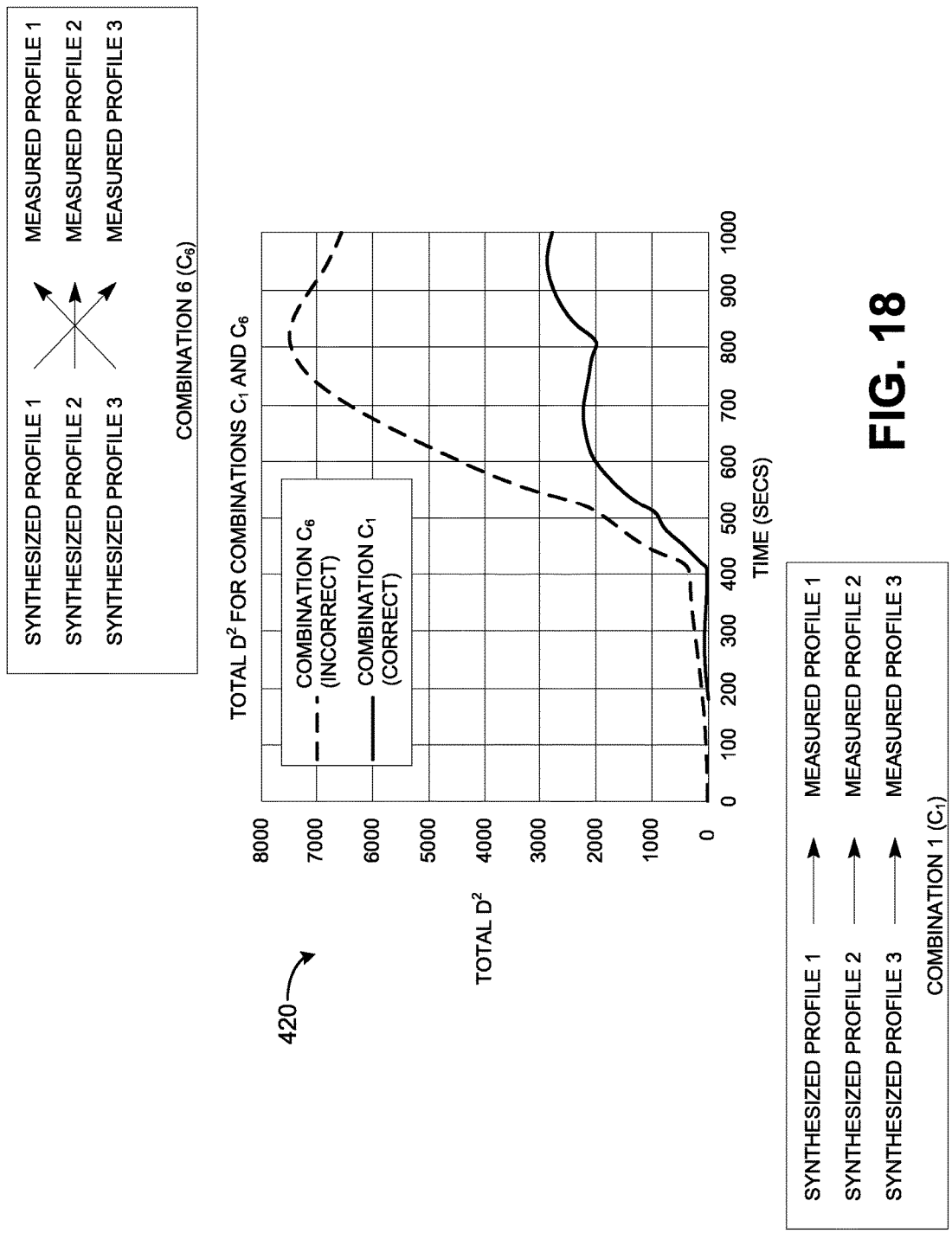
FIG. 18 illustrates a chart that plots a total cumulative Mahalanobis distance as a function of time for two combinations of measured profiles and synthesized profiles.

FIG. 18 illustrates a chart 420 that plots the total cumulative Mahalanobis Distances $\overline{D}_{i_{C1}}^{2}$ and $\overline{D}_{i_{C6}}^{2}$ vs. time (in seconds) for Combinations 1 and 6, respectively. Since Combination 1 is completely correct, Mahalanobis Distance of Combination 1, $\overline{D}_{i_{C1}}^{2}$, is smaller than the Mahalanobis Distance of Combination 6, $\overline{D}_{i_{C6}}^{2}$, over the entire time except the for the beginning (e.g., up to about 50-100 seconds) where the amount of data collected was too small to reveal a significant distinction between Combination 1 and Combination 6.

Figure 19:
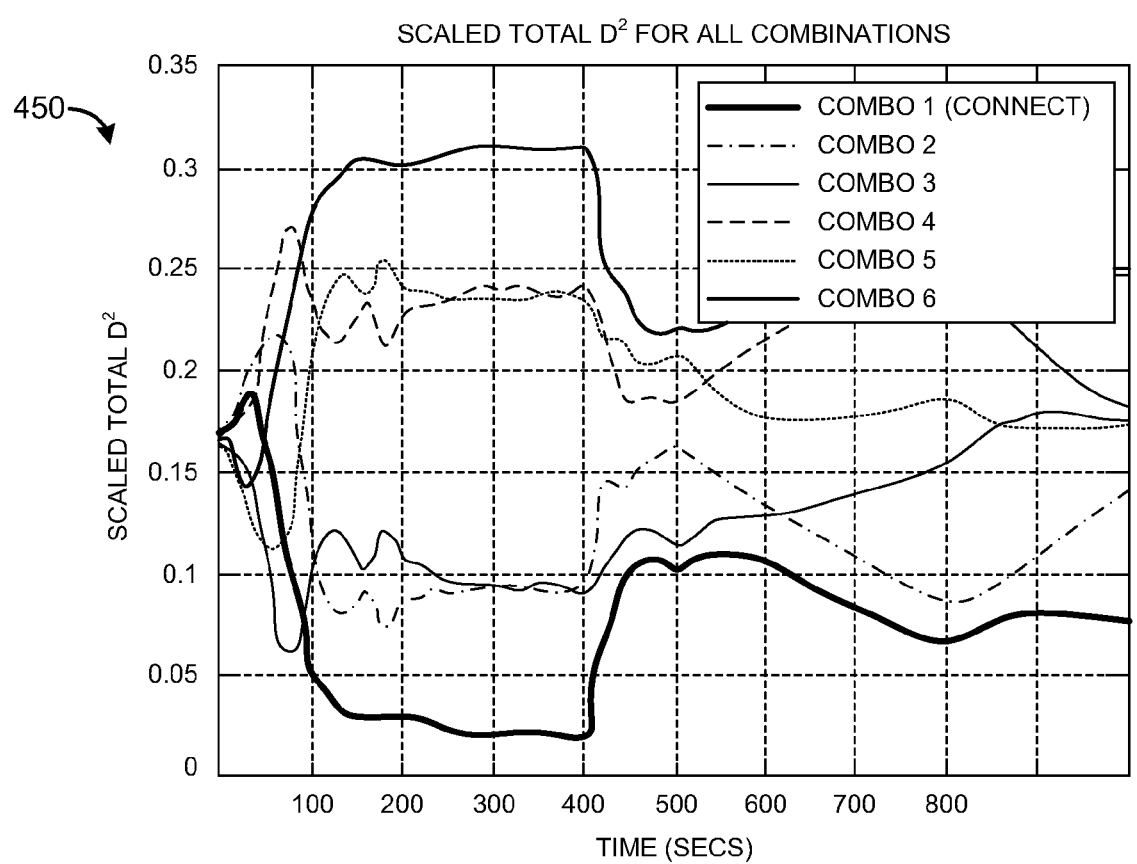
FIG. 19 illustrates a chart plotting a total cumulative Mahalanobis distance as a function of time for each possible combination of measured profiles and synthesized profiles.

For the given example, FIG. 19 illustrates a chart 450 plotting of a total cumulative Mahalanobis distance as a function of time (in seconds) for each possible combination of measured profiles and synthesized profiles. In the chart 450, each of the six curves (labeled in FIG. 18 as "COMBO 1" ... "COMBO 6") are rescaled such that the sum of all six curves as a given time is equal to '1'. As is illustrated, combination 1 has the smallest statistical distance over time. In the given example, combination 1 corresponds to: the measured profile of Target 1 being matched with the synthesized profiles of the first target, the measured profile of Target 2 being matched with the synthesized profiles of the second target and the measured profile of Target 3 being matched with the synthesized profile of the third target.

By employing the profile matching in the manner described herein, the profile matcher 116 can generate combined target data sets that characterizes features of the measured profile (a target ID, an LoB and Rdot) with features detected by the active sensor system (e.g., the position and track) (or some subset thereof) of each target in the area of interest. In this manner, inherent limitations of the active sensor system and the passive sensor system can be overcome to provide the combined target data set. That is, intelligence gathered from the passive sensor system can be combined and reconciled with intelligence gathered from the active sensor system. The combined target data set for each target (Target 1, Target 2 and Target 3 in the given example) can be provided to a graphical user interface (GUI) 120. Moreover, the GUI 120 can employ the combined target data set of each target to generate output for a display.

Figure 20:
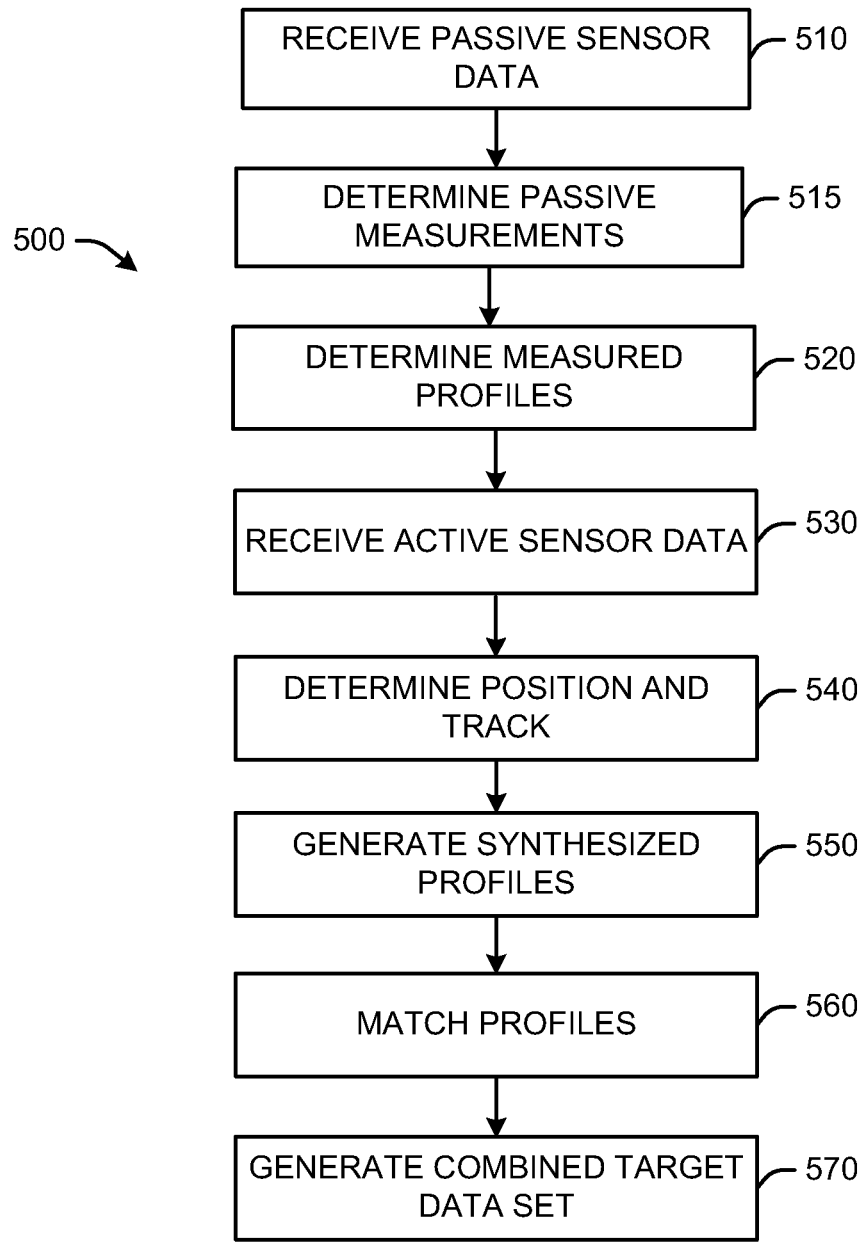
FIG. 20 illustrates a flowchart of an example method for matching a synthesized profile to a measured profile for a target.

In view of the foregoing structural and functional features described above, example methods will be better appreciated with reference to FIG. 20. While, for purposes of simplicity of explanation, the example method of FIG. 20 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method. The example method of FIG. 19 can be implemented as instructions stored in a non-transitory machine-readable medium. The instructions can be accessed by a processing resource (e.g., one or more processor cores) and executed to perform the methods disclosed herein.

FIG. 20 illustrates an example flowchart of a method 500 for associating a measured profile of a target with a synthesized profile of a target. The method 500 could be implemented, for example, by the system 50 illustrated in FIG. 1 and/or the target verifier 100 illustrated in FIG. 2. At 510, passive sensor data can be received at a passive senor system (e.g., the passive sensor system 58 of FIG. 1). The passive sensor data can characterize RF signals that are passively received from K number of targets in an area of interest, where K is an integer greater than or equal to one. At 515, the passive sensor system can determine passive measurements that characterize the LoB and Rdot for each of the K number of targets. The passive measurements can be provided to the target identifier. At 520, a measured profile of each of the K number of targets can be generated by the target identifier based on the passive measurements. Each measured profile can include a target ID, an LoB over a given period of time and an Rdot over the given period of time for a corresponding target.

At 530, active sensor data can be received from an active sensor system (e.g., the active sensor system 56 of FIG. 1). The active sensor data can characterize RF signals that are reflected by each of the K number of targets in response to a transmitted signal. At 540, a position and track for each of the K number of targets can be determined by the target identifier based on a measured range and azimuth for each of the K number of targets over a given time period that are characterized in the active sensor data.

At 550, the target identifier can generate synthesized profiles for each of the K number of targets based on the active sensor data and kinematics (e.g., position and velocity) of the passive sensor system. The synthesized profiles can also include the measured position and track of a corresponding target. At 560, the target identifier can perform statistical analysis (e.g., including employing Equations 1 and 2) to match each of the measured profiles for the K number of targets with a corresponding synthesized profile for the K number of targets. For instance, in a manner illustrated and described with respect to FIGS. 17 and 18, Equations 1-4 can be employed to calculate a total statistical distance (e.g., a total cumulative Mahalanobis distance) between each possible combination of the measured profiles and the synthesized profiles to determine a correct combination of measured profiles matched with synthesized profiles. At 570, the target identifier can generate a combined target data set for each of the K number of targets based on the matching of the measured and synthesized profiles. Each combined target data set can include a target ID, an LoB over a given time period, an Rdot over the given time period, a position and a track for a corresponding target, or some subset thereof. In this manner, intelligence gathered about the K number of targets from the passive sensor system can be matched and/or reconciled with intelligence gathered from the active sensor system.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processors of a general purpose computer, special purpose computer, or other programmable data processing apparatus (or a combination of devices and circuits) to produce a machine, such that the instructions, which execute via the one or more processors, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A target identifier comprising one or more computing devices having machine readable instructions, the target identifier being configured to:
    determine a synthesized profile for a target based on active sensor data that characterizes a radio frequency ("RF") signal transmitted by an active sensor system and reflected by the target and received at the active sensor system, wherein the synthesized profile characterizes an estimated Line of Bearing ("LoB") and a radial speed ("Rdot") of the target relative to a passive sensor system; and
    match the synthesized profile with a measured profile that is determined based on RF signals that are transmitted by the target or RF signals broadcast by a communication system that are reflected by the target and the RF signals are received at the passive sensor system, wherein the measured profile characterizes a measured LoB and a measured Rdot of the target.

2. The target identifier of claim 1, wherein the active sensor system and the passive sensor system are remotely located from each other.

3. The target identifier of claim 1, wherein the synthesized profile is further based on kinematics of the passive sensor system.

4. The target identifier of claim 3, wherein the kinematics of the passive sensor system comprises data characterizing a position and a velocity of the passive sensor system.

5. The target identifier of claim 1, wherein the matching comprises executing a statistical analysis comparing the synthesized profile with the measured profile.

6. The target identifier of claim 5, wherein the statistical analysis comprises calculating a Mahalanobis distance between the measured profile and the target profile.

7. The target identifier of claim 6, wherein:

$$D_i^2 = (m_i - s_i)^T S_i^{-1} (m_i - s_i);$$

wherein:

$D_i^2$ is the Mahalanobis distance for the the point $i$;

$$m_i = \begin{pmatrix} \text{Measured } Rdot \text{ at update } i \\ \text{Measured } LoB \text{ at update } i \end{pmatrix};$$

$$s_i = \begin{pmatrix} \text{Synthesized } Rdot \text{ at update } i \\ \text{Synthesized } LoB \text{ at update } i \end{pmatrix};$$

-continued $$S_i = \begin{bmatrix} \sigma^2_{Rdot_i} & 0 \\ 0 & \sigma^2_{LoB_i} \end{bmatrix};$$

$i$ is the given instance in time;

$\sigma^2_{Rdot_i}$ is the Measured $Rdot$ Uncertainty$^2$ + Synthesized $Rdot$ Uncertainty$^2$; and $\sigma^2_{LoB_i}$ is the Measured $LoB$ Uncertainty$^2$ + Synthesized $LoB$ Uncertainty$^2$.

8. The target identifier of claim 7, wherein the statistical analysis comprises calculating a cumulative Mahalanobis distance between the measured profile and the target profile.

9. The target identifier of claim 8, wherein:

$$\overline{D}_i^2 = \frac{1}{i}\sum_{k=1}^{i} D_k^2;$$

wherein, $\overline{D}_i^2$ is the cumulative Mahalanobis distance between the measured profile and the target profile.

10. The target identifier of claim 9, wherein the statistical analysis comprises calculating a total cumulative Mahalanobis distance for a combination of pairings of measured profiles and synthesized profiles, wherein the total cumulative Mahalanobis distance is equal to a sum of cumulative Mahalanobis distances within the combination, wherein each of the cumulative Mahalanobis distances corresponds to a cumulative Mahalanobis distance between a given measured profile of the measured profiles and a given synthesized profile of the synthesized profiles.

11. The target identifier of claim 1, further comprising generating a combined target data set for the target based on the matching.

12. The target identifier of claim 11, wherein the combined target data set comprises:
a target identification for the target;
an Rdot of the target over a given time period;
an LoB of the target over the given time period;
a position of the target; and
a track of the target.

13. A system comprising:
an active sensor system configured to measure radio frequency ("RF") signals transmitted by the active sensor system and reflected from a plurality of targets, wherein reflected RF signals characterize a range and azimuth for each of the plurality of targets;
a passive sensor system configured to passively receive RF signals transmitted by the plurality of targets or RF signals broadcast by a communication system and reflected by the plurality of targets;
a passive sensor analyzer configured to generate a measured profile for each of the plurality of targets based on the passively received RF signals, wherein each measured profile characterizes a measured Line of Bearing ("LoB") and a measured Radial speed ("Rdot") over a time period of a corresponding target of the plurality of targets relative to the passive sensor system; and
an active sensor analyzer configured to:
determine a position and a track for each of the plurality of targets; and
determine a synthesized profile for each of the plurality of targets based on the reflected RF signals, wherein the synthesized profile characterizes an estimated LoB and an estimated Rdot over the time period for each of the plurality of targets; and
a profile matcher configured to match each of the measured profiles with a corresponding synthesized profile.

14. The system of claim 13, wherein the matching by the profile matcher further comprises executing a statistical analysis comparing each synthesized profile for each of the plurality of targets with each measured profile for each of the plurality of targets.

15. The system of claim 14, wherein the statistical analysis comprises calculating a total cumulative Mahalanobis distance for each possible combination of the measured profiles and the synthesized profiles for the plurality of targets.

16. The system of claim 14, wherein the statistical analysis comprises calculating a Mahalanobis distance between each measured profile and each synthesized profile for each of the plurality of targets.

17. The system of claim 16, wherein the profile matcher is further configured to generate a combined target data set for each of the plurality of targets based on the matching.

18. The system of claim 17, wherein each combined target data set for each of the plurality of targets comprises:
a target identification for the target;
an Rdot of the target over the time period;
an LoB of the target over the time period;
a position of the target; and
a track of the target.

19. A method comprising:
determining a measured profile for each of a plurality of targets based on passive measurements of RF signals transmitted by the plurality of targets or RF signals broadcast by a communication system and reflected by the plurality of targets, each measured profile characterizing a measured Line of Bearing ("LoB") and a measured radial speed ("Rdot") over a time period relative a passive sensor system that determines the passive measurements;
generating a synthesized profile for each of the plurality of targets based on data that characterizes RF signals transmitted from an active sensor system and reflected from the plurality of targets, wherein each synthesized profile characterizes an estimated LoB and an estimated Rdot over the time period for a corresponding target; and
matching each measured profile with a corresponding synthesized profile based on a statistical analysis.

20. The method of claim 19, further comprising generating a combined target data set for each of the plurality of targets in response to the matching.

* * * * *